United States Patent [19]

Banerjee et al.

[11] Patent Number: 5,426,774
[45] Date of Patent: Jun. 20, 1995

[54] METHOD FOR MAINTAINING A SEQUENCE OF EVENTS FUNCTION DURING FAILOVER IN A REDUNDANT MULTIPLE LAYER SYSTEM

[75] Inventors: Indra Banerjee, Conshohocken; Paul F. McLaughlin, Hatfield; Kevin R. McCracken, Warrington, all of Pa.

[73] Assignee: Honeywell Inc., Minneapolis, Minn.

[21] Appl. No.: 42,923

[22] Filed: Apr. 6, 1993

[51] Int. Cl.⁶ .............................................. G06F 11/00
[52] U.S. Cl. ................................................ 395/575
[58] Field of Search ...................... 395/575; 371/7, 8.1, 371/16.5, 29.1, 11.1, 11.3

[56] References Cited

U.S. PATENT DOCUMENTS

| | | | |
|---|---|---|---|
| 4,751,702 | 6/1988 | Beier | 371/9 |
| 4,890,222 | 12/1989 | Kirk | 364/200 |
| 4,933,940 | 6/1990 | Walter et al. | 371/9.1 |
| 5,010,560 | 4/1991 | Janney et al. | 377/20 |
| 5,016,244 | 5/1991 | Massey, Jr. et al. | 370/16 |
| 5,136,498 | 8/1992 | McLaughlin et al. | 371/9.1 |
| 5,136,643 | 8/1992 | Fischer | 380/23 |
| 5,146,401 | 9/1992 | Bansal et al. | 364/238.2 |
| 5,157,667 | 10/1992 | Carusone, Jr. et al. | 371/29.1 |
| 5,170,480 | 12/1992 | Monan et al. | 395/575 |
| 5,181,204 | 1/1993 | Kasman | 371/16.5 |
| 5,210,756 | 5/1993 | Kummer et al. | 371/8.1 |
| 5,233,545 | 8/1993 | Ho et al. | 371/13 |
| 5,253,184 | 10/1993 | Kleinschnitz | 371/29.1 |
| 5,278,982 | 1/1994 | Daniels et al. | 364/200 |
| 5,309,555 | 5/1994 | Akins et al. | 395/157 |

OTHER PUBLICATIONS

Baker Jr. et al "Priority Event Monitoring for Interrupt-Driven Computer" 1992 Industry Applications Society Annual Meeting/IEEE pp. 1751–1755.

Herliny et al "Time Stamp-Based Orphan Elimination" IEEE Trans. on Software Engineering 1989 pp. 825–831.

Saisho et al "A Time Stamp Based Concurrency Control Mechanism for Redundant Computing Systems" 1990 IEEE p. 553.

*Primary Examiner*—Robert W. Beausoliel, Jr.
*Assistant Examiner*—Joseph E. Palys
*Attorney, Agent, or Firm*—A. A. Sapelli; W. Udseth

[57] ABSTRACT

In a process control system having a redundant multilayer hierarchical structure, each node of a layer being redundant sequence of events inputs are received from field devices by an input/output processor (IOP). The IOP is a digital input sequence of events (DISOE) IOP, the IOP being the lowest layer of the hierarchical structure. The IOP interfaces with a controller at the next layer of the hierarchy. A method for reliably maintaining a sequence of events function during a failover of any of the redundant nodes, comprising the steps of maintaining a log, a circular list, by the local DISOE. The circular list is a rolling log of all sequence of events data for a predefined time period. When a failover occurs, the new primary commands an event recovery. The event recovery process freezes the log and uses the information in the log to recreate the events data. The freeze operation inhibits background purge activity for the log thereby avoiding the deletion of information past the defined time. New events data is still entered in the log. Once the log has been processed the freeze operation is negated. The recreated data is transmitted to the controller in accordance with a predefined protocol, thereby avoiding the loss of any events data as a result of the failover.

2 Claims, 9 Drawing Sheets

METHOD FOR MAINTAINING A SEQUENCE OF EVENTS FUNCTION DURING FAILOVER IN A REDUNDANT MULTIPLE LAYER SYSTEM

BACKGROUND OF THE INVENTION

The present invention relates to a method of failover in redundant systems, and more particularly, to a method for maintaining a sequence of events function during a failover in a redundant system having multiple layers.

In a process control system, the system of the preferred embodiment, intermediate layers (of a hierarchical scheme of the system) between an input device and a historization device have redundancy due to process control security needs. As a result, the sequence of events information could be lost in the event of a failover. Thus, there is provided by the present invention a method which maintains the sequence of events information from multiple modes of a network even if one or more of these nodes should sustain a failover.

SUMMARY OF THE INVENTION

Therefore, there is provided by the present invention, a method for maintaining a sequence of events (SOE) function during failover in a redundant multiple layer system. In a process control system having a redundant multilayer hierarchical structure, each node of a layer providing optional redundancy, sequence of events inputs are received from field devices by an input/output processor (IOP). The is a digital input sequence of events (DISOE) IOP, the IOP being the lowest layer of the hierarchical structure. As a method for reliably maintaining a sequence of events function during a failover of any of the redundant nodes, comprising the steps of receiving events information from the field devices by the IOPs, a first buffer is maintained with events data, the events data being time stamped by the receiving IOP with the time of receipt. The events data in the first buffer is the events data received since the previous transmission of the events data to the controller, the controller being the next layer in the hierarchy of the process control system, A second buffer is maintained with events data, the events data being time stamped by the receiving IOP with the time of receipt. The events data in the second buffer is events data received within a predetermined period of time such that a history of events is maintained for the predetermined period, Upon request from the controller, the events data is transmitted from the first buffer to the controller. When a failover occurs at any of the hierarchical layers is detected, then upon a request for event recovery from any of the hierarchical layers, the events data from the second buffer is recreated with original time information intact to transmit the recreated events data to the controller in accordance with a predefined protocol thereby avoiding the loss of any events data as a result of the failover.

Accordingly, it is an object of the present invention to provide a method for maintaining a sequence of events function.

It is another object of the present invention to provide a method for maintaining a sequence of events function during failover in a redundant multiple layer system.

These and other objects of the present invention will become more apparent when taken in conjunction with the following description and attached drawings, wherein like characters indicate like parts, and which drawings form a part of the present application.

DETAILED DESCRIPTION

Figure 1:
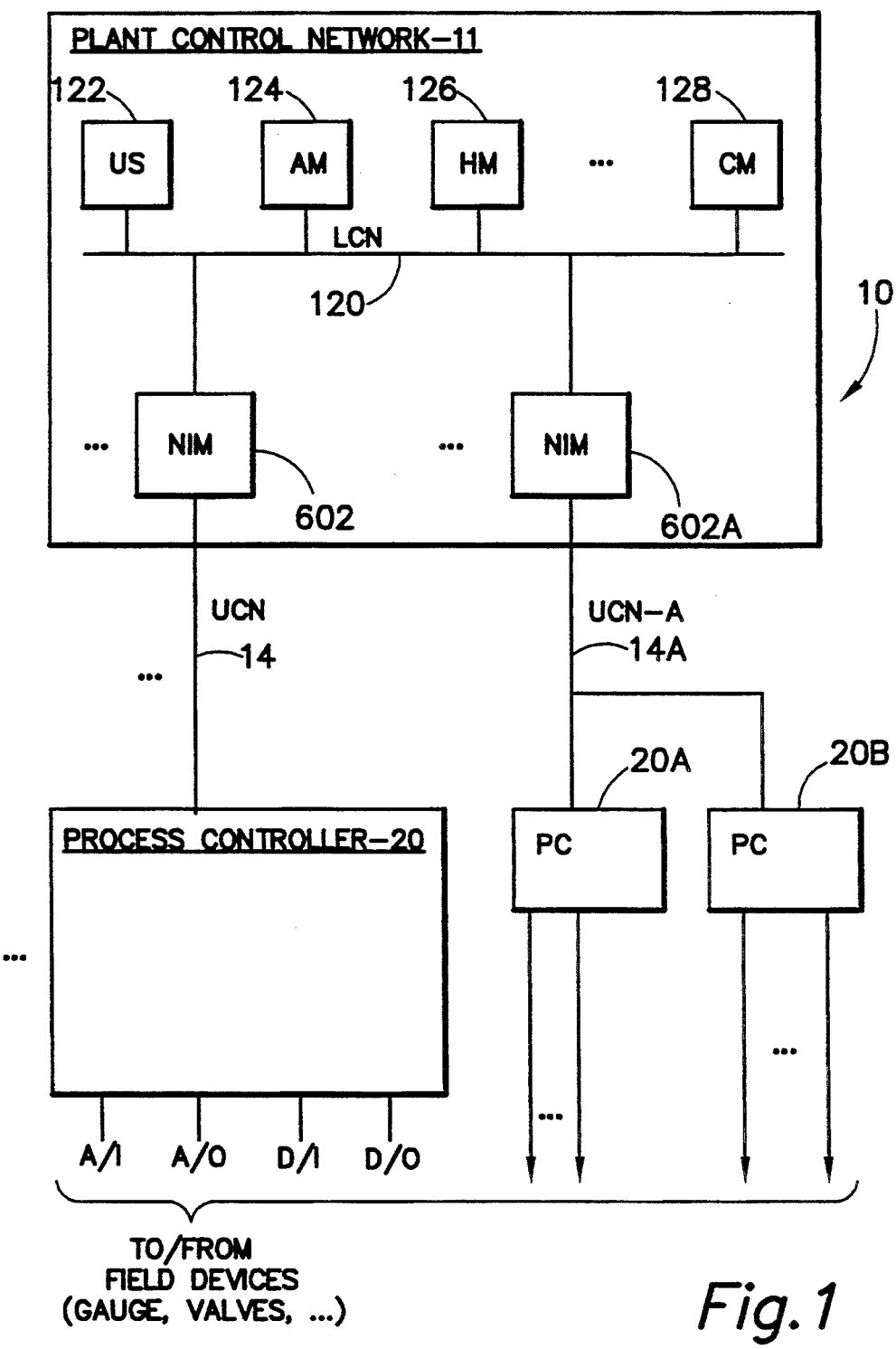
FIG. 1 shows a block diagram of a process control system in which the present invention can be utilized.
Figure 2:
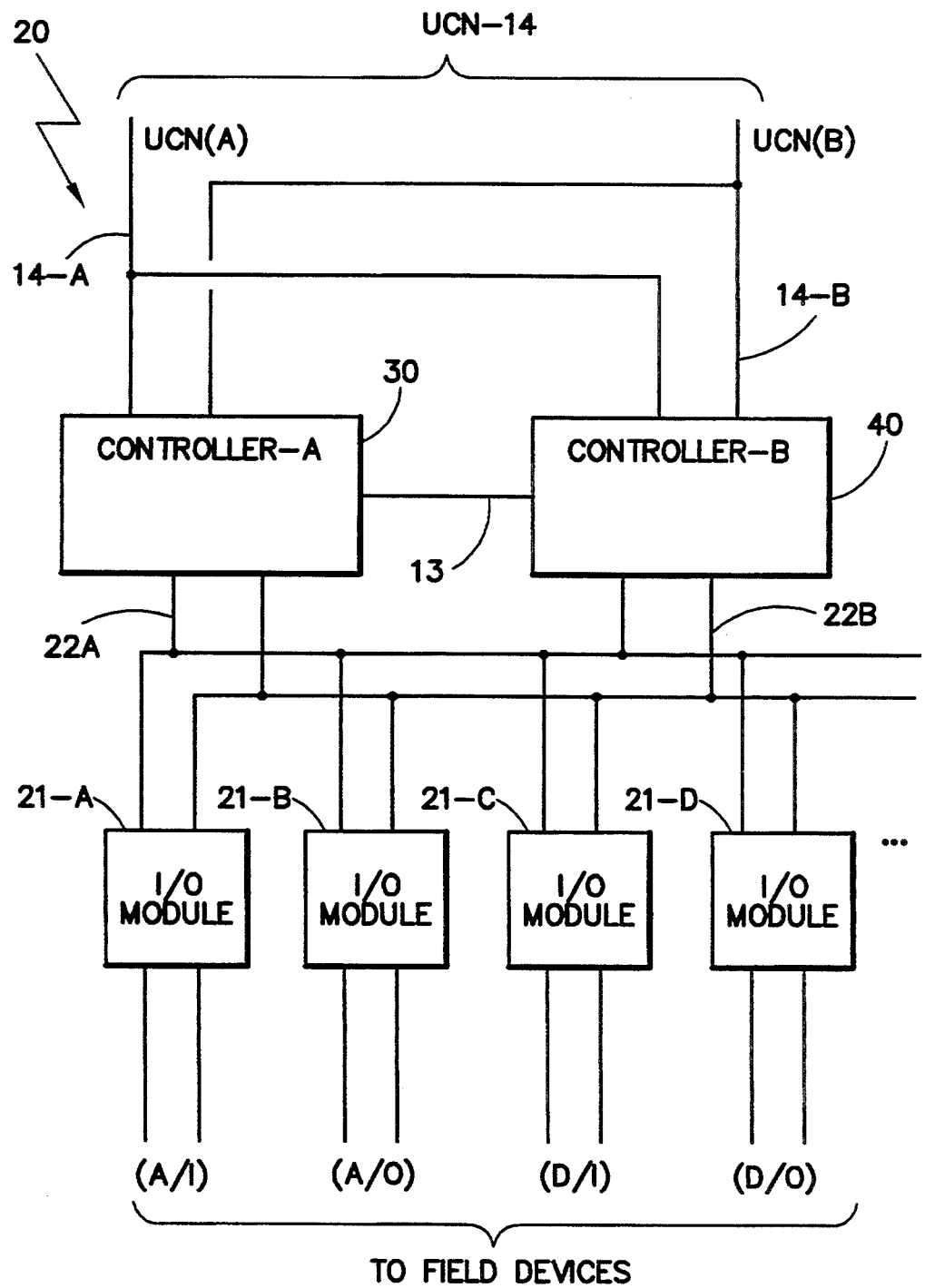
FIG. 2 shows a block diagram of a process controller, including I/O modules (IOP), in which the present invention can be utilized.

Before describing the method of the present invention, it will be helpful in understanding a system environment in which the present invention can be utilized. Referring to FIGS. 1 and 2, there is shown a block diagram of a process control system 10 in which the present invention can be found.

The individual layers of the process control systems include an input processor device (IOP 21) used to detect digital state change activity, a controller 30, 40, (input processor devices 21 and the controller 30, 40 make up a process controller 20), a network interface (NIM 602) which allows a network of process controllers 20 to be interfaced to a local area network (plant control network 11) which includes man machine interface devices (US 122) and a historization device (HM 126). The present invention allows for any of these interposing devices to be made redundant for the critical needs of process control, while ensuring that SOE information is not lost due to the failover of any one or more nodes in the hierarchy. The essential method by which this is accomplished is to conjoin the existing function of event recovery with a new mechanism whereby the Input Processor can recreate SOE information following the failover of an upper-layer node or a failover from a redundant partner, as will be described hereinunder.

The structure of the process control system 10 will now be described. Referring to FIG. 1, there is shown a block diagram of the process control system of the preferred embodiment. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via the same UCN 14, and additional UCNs 14 can be added to the plant control network 11 via additional corresponding NIMs 602. The process controller 20, interfaces analog input and output signals, and digital input and output signals (A/I, A/O, D/I, and D/O, respectively) to the process control system 10 from the variety of field devices (not shown) which include, pumps, motors, valves, pressure switches, pressure gauges, thermocouples, . . . . Inputs also include relay closures and the like indicative of the occurrence of a predefined event.

The plant control network 11 provides the overall supervision of a controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/-supervisory function of the process being controlled. Each of these physical modules is operatively connected to a local control network (LCN) 120 which permits each of these modules to communicate with each other as necessary. The NIM 602 provides an interface between the LCN 120 and the UCN 14. A more complete description of the plant control network 11, and the physical modules can be had by reference to U.S. Pat. No. 4,607,256.

Referring to FIG. 2 there is shown a block diagram of the process controller 20. The preferred embodiment of the process controller 20 of the preferred embodiment of the process control system 10 includes a controller A 30 and a controller B 40, which effectively operate as a primary and secondary controller. Controller A 30 and controller B 40 are connected to the UCN 14, the UCN 14 in the preferred embodiment, comprising for communication redundancy purposes, a UCN(A) 14A and a UCN(B) 14B. Input/output processors (IOPs) (sometimes referred to herein as input output (I/O) modules) 21 interface to field devices, field devices being various pumps, motors, valves, pressure switches, pressure gauges, thermocouples, . . . which can be analog inputs (A/I), analog outputs (A/O), digital inputs (D/I), and digital outputs (D/O). The controller A 30 and controller B 40 interface to one or more I/O modules via a bus 22, the bus 22 in the preferred embodiment, comprising for communication redundancy purposes, a bus 22A and a bus 22B.

Controller A and controller B, 30, 40, can communicate with each other via three mediums, the UCN 14, a link 13 between the controllers, and the buses 22A, 22B, with bus 22A and bus 22B in the preferred embodiment being serial I/O links. One controller (controller A 30 or controller B 40) operates as a primary controller and the other controller operates as a secondary controller (in more of a reserve mode than a back-up, in that if a failure of controller A 30 should occur, controller B is ready to take over the control function with essentially no start-up or initialization time). On a predetermined time basis, point processing is performed by the controller designated as the primary controller and communicates with the I/O modules 21. In addition, the controller acting as the primary controller communicates with the plant control network 11 reporting status, history, and accepting inputs from the plant control network such as commands from the operator via the universal station 122. In addition, a data base maintained by the primary controller is communicated to the secondary controller via link 13. As mentioned above, one controller operates as a secondary controller; however, it will be understood by those skilled in the art that a secondary controller is not necessary for the process controller 20. A more complete description of process controller 20, which includes controller 30 and IOP 21, can be had by reference to U.S. Pat. No. 5,146,401.

Figure 3:
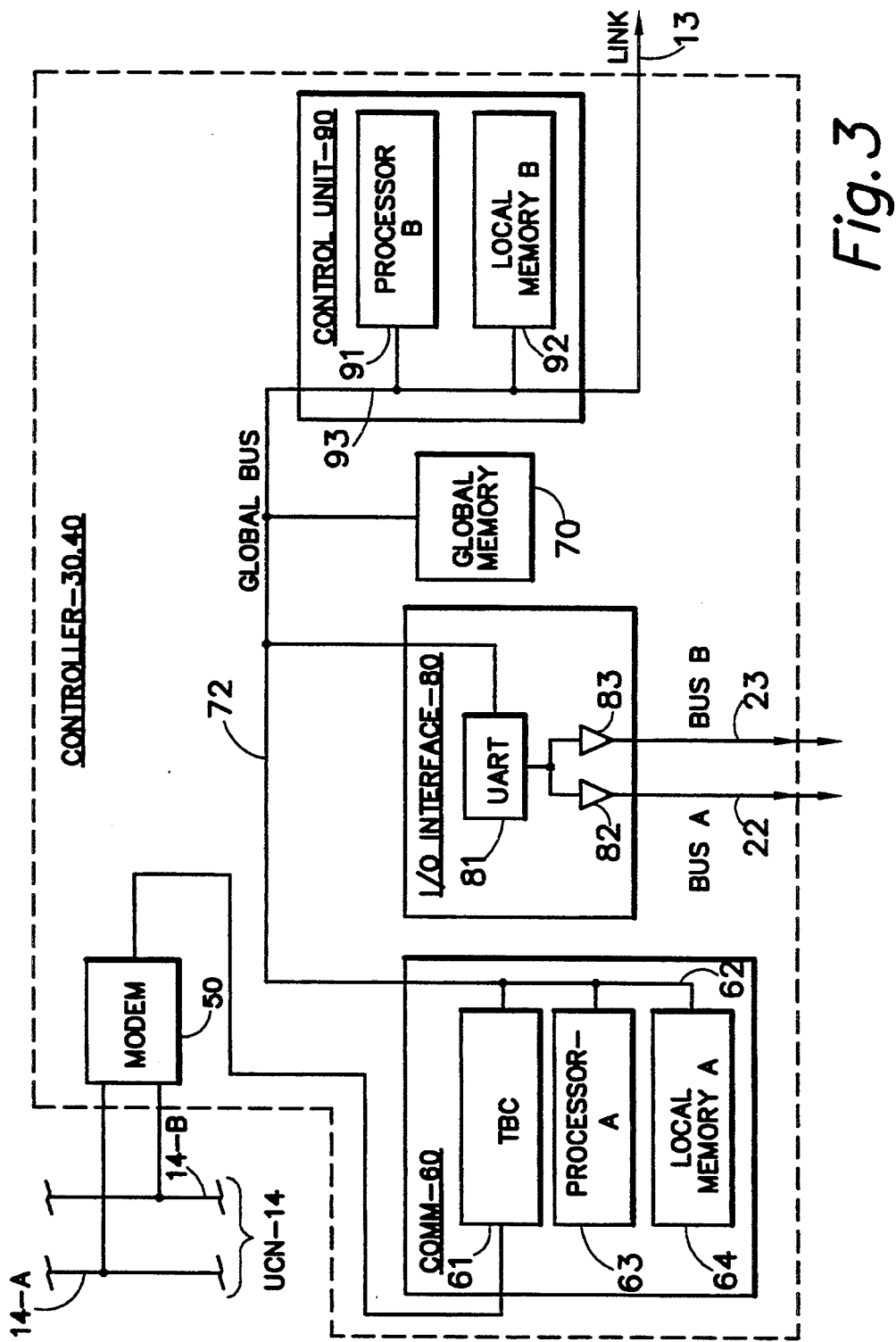
FIG. 3 shows a block diagram of a controller which is included in the process controller of FIG. 2.

Referring to FIG. 3, there is shown a block diagram of the controller 30, 40. A modem 50 is connected to the UCN 14, the modem having two inputs, one connected to UCN 14A and the other connected UCN 14B. The modem 50 interfaces with a communication unit (COMM) 60 which in turn interfaces with a global memory 70, an I/O interface unit 80, and a control unit 90 via global bus 72. The communication unit 60 includes a communication control unit, in the preferred embodiment a token bus controller (TBC) 61, Motorola type 68824, which is connected to a local bus 62. A processor A 63 (which essentially performs the communication function) is connected to the local bus 62, and a local memory A 64, which is also connected to the local bus 62. The processor A 63 communicates with the plant control network 11 via modem 50 and TBC 61. The local memory A 64 stores information, including personality image which is downloaded from the plant control network 11, for use by processor A 63 and TBC 61. The global memory 70 stores information which is common to both processor A 63 and a processor B 91. It also stores all the data received from bus 22A and bus 22B. The global memory 70 also serves as an interprocessor communication vehicle between the processors A 63 and B 91. Control unit 90 includes the processor B 91 and a local memory B 92, both connected to a local bus 93. Processor B 91 performs the control function (i.e., control processing) relating to the field devices. This essentially includes performing the point processing, and updating the local memory B 92 and global memory 70. Also coupled to the local bus 93 of control unit 90 is a track unit (not shown) which is utilized to implement the data base transfer via link 13 to the other controller 30, 40 of the process controller 20.

The I/O interface unit 80 includes a receiver-transmitter device, this device being a UART (Universal Asynchronous Receiver/Transmitter) 81. The UART 81 is coupled through drivers 82, 83 to bus 22A and bus 22B, respectively.

Processor B 91 receives data from the various field devices through global memory 70, performs the necessary point processing and control function, and then updates the local memory B 92 and global memory 70, as required. The communication unit 60, in response to commands from the control unit 90 via global memory 70, inputs and outputs data between the I/O modules 21 (via the I/O interface unit 80) and the global memory 70, thereby relieving the control unit 90 from the burden of I/O module management. In this manner the control processing is performed by the control unit 90 within the process controller 20 for the predefined attached field devices, and the communication (i.e., the I/O control) is handled by the communication unit 60 through the UART 81.

Figure 4:
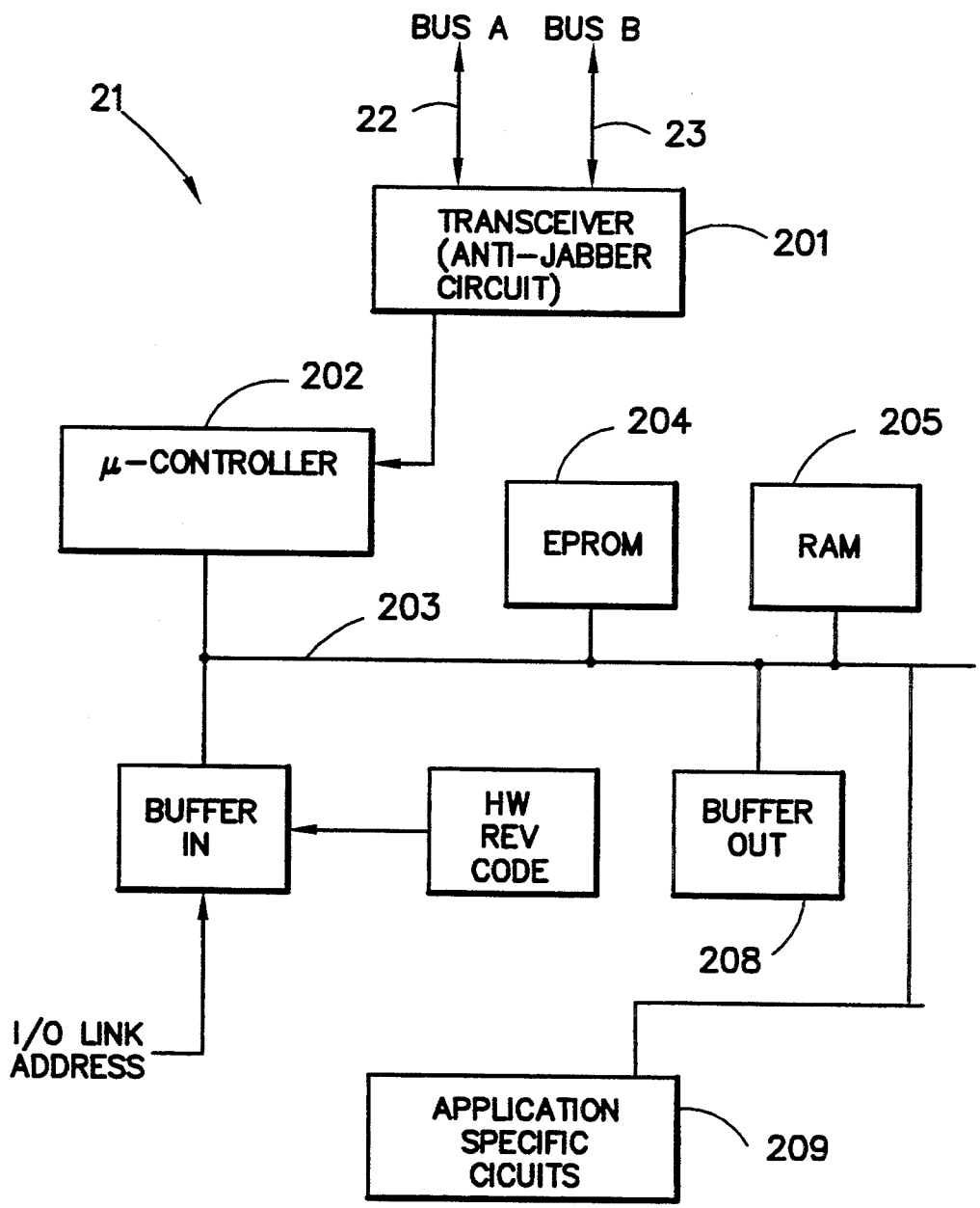
FIG. 4 shows a block diagram of an I/O module which is included in the process controller of FIG. 2.

Referring to FIG. 4 there is shown a partial block diagram of an I/O module of the components of interest. A transceiver (anti-jabber circuit) 201 interfaces with bus 22A and bus 22B. The transceiver 201 interfaces with a microcontroller (u-controller) 202 which, in the preferred embodiment, is of the type, Intel 80C31. The microcontroller is coupled to a local bus 203, and includes an EPROM 204 and a RAM 205 also connected to the local bus 203. The RAM 205 contains the information which forms the database for the I/O module 21. The EPROM 204 contains the program information utilized by the microcontroller 202. The application specific circuits 209 are also connected to the local bus 203, and the microcontroller 202 via the local bus 203. The application specific circuits 209 vary from I/O module to I/O module depending on the field device to which the I/O module is to be coupled. If the field device is of a type which requires a digital input, then the application specific circuit 209 will include the logic in order to place the digital input into a predefined format which will interface with the remainder of the I/O module. Likewise, if the field device is such that requires an analog input, then the application specific circuit contains logic which converts the analog input signal (via an A/D converter) into a format again consistent with predefined formats. In this manner, the I/O modules are referred to as a specific I/O module type. The microcontroller 202 performs the I/O processing (or preprocessing) for the application specific circuits 209. The preprocessing will vary from each I/O module 21 depending on the type (i.e., A/I, A/O, . . . ) the preprocessing essentially consisting of translating the signals from the application specific circuits to a format compatible with the controller 30, 40, and putting the signals from controller 30, 40 in a format compatible with the I/O module 21. Some of the preprocessing performed includes zero drift, linearization (linearizing thermocouples), hardware correction, compensation (gain compensation and zero compensation), reference junction compensation, calibration correction, conversions, checking for alarms (limits) . . . and generating a signal in a predetermined mined format having predetermined scale (i.e., engineering units, normalized units, percent of scale, . . . ). In the preferred embodiment seven types of applications specific circuits are provided for, these include a high level analog input, low level analog input, analog output, digital input, digital output, smart transmitter interface, and pulse input counter.

Figure 5:
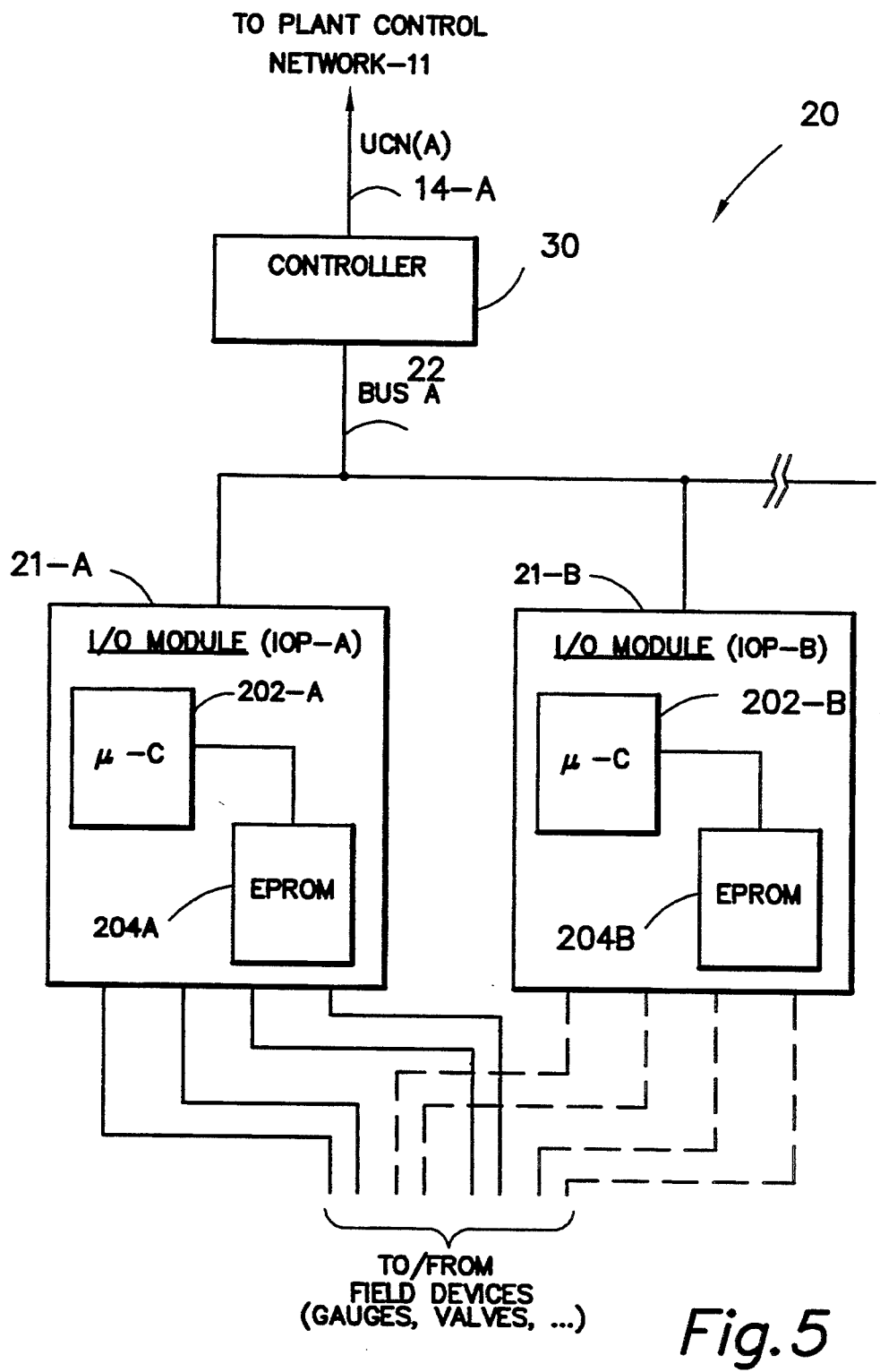
FIG. 5 shows a simplified block diagram of the process controller of FIG. 2.

The IOP redundancy will now be described. Referring to FIG. 5, there is shown a simplified block diagram of the process controller 20 of FIG. 2, having the redundancy of the controller omitted, and having an IOP and a backup IOP, only, for purposes of example. In the preferred embodiment, up to forty (40) IOPs can be included, and any mix of IOP types can be included in a redundant or non-redundant configuration. Note optional redundancy of each IOP. As will be recognized by those skilled in the art from the description above, the controller 30 performs as the master processor, the IOP module 21-A as the primary slave processor, and the IOP module 21-B as the backup (or secondary or redundant) slave processor.

Initially, the controller 30 acts to synchronize the IOP(B) 21-B (assuming, of course, that IOP(B) is present). Synchronizing is the process whereby the same data base is contained in both IOP(A) 21-A and IOP(B) 21-B. The information of the data base of IOP(A) is requested by the controller 30. IOP(B) 21-B eavesdrops on the transmissions of data from IOP(A) 21-A to the controller 30 and stores the information in its data base memory thereby causing the data base of IOP(B) 21-B to be the same, whereupon IOP(B) is commanded to start executing. IOP(B) performs the same operations as IOP(A) at essentially the same time (however, each IOP is operating using its own clock). It will be recognized that IOP(B) 21-B is a dedicated backup. Once IOP(B) is synchronized, the controller data base is updated to indicate the status of IOP(B). Further details describing the communication scheme between the controller 30 and the IOP(A) and IOP(B), and the method of failover from IOP(A) to IOP(B) can be had by reference to U.S. Pat. No. 5,136,498, assigned to the same assignee as the assignee of the present application.

Figure 6:
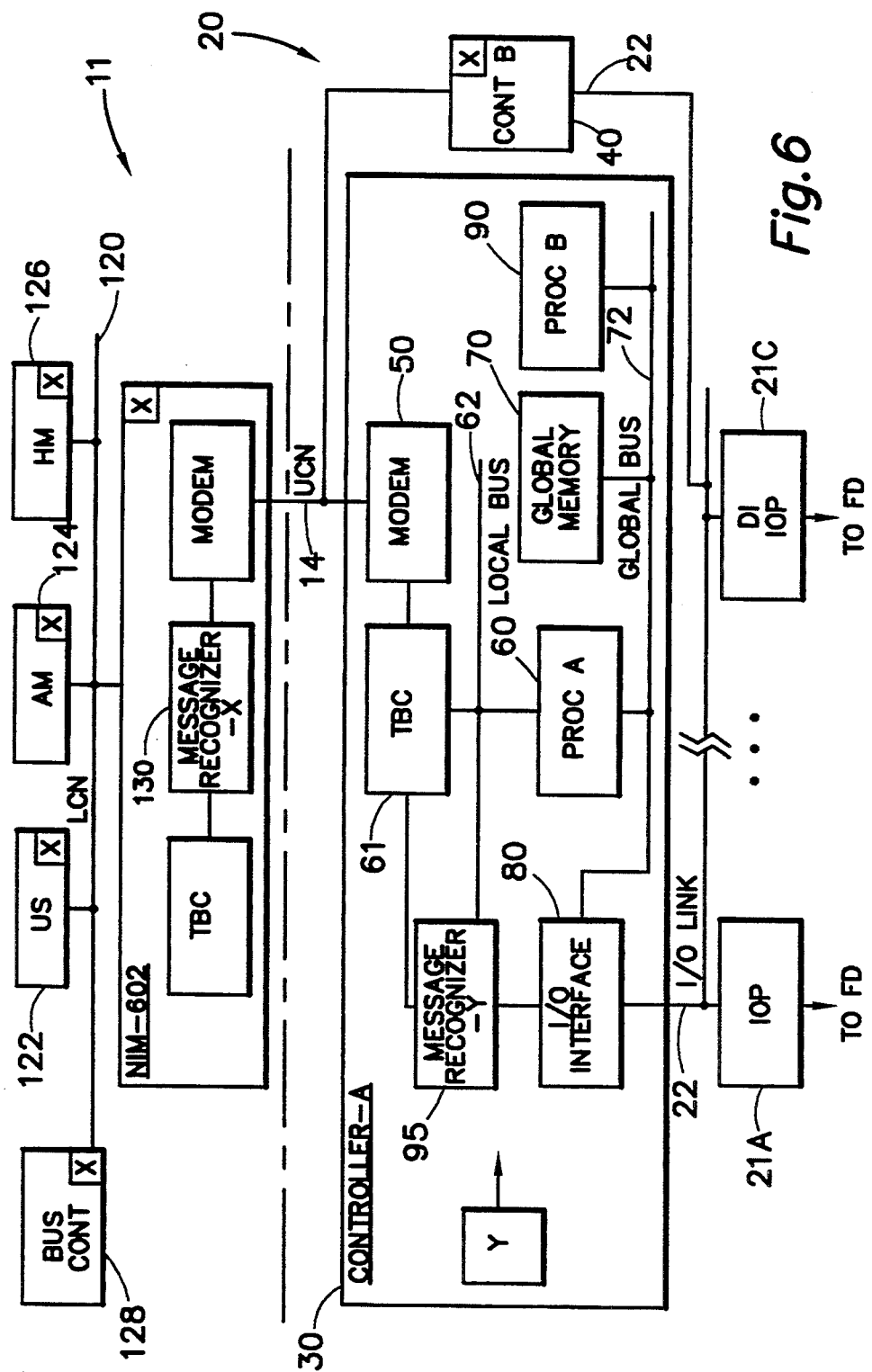
FIG. 6 shows a block diagram of the preferred embodiment of the process control system which includes a message recognizer for achieving time synchronization of the hierarchical layers of the process control system.

Generally, hierarchical networks are software-driven and have variable/unpredictable delays in the network hardware and software between the time messages are queued for transmission and actually transmitted, and between the time messages are received and actually processed. This lack of determinism prevents synchronization of time broadcast via messages containing high-precision clock times. The method of time synchronization of the preferred embodiment will now be described. Referring to FIG. 6, there is shown a block diagram of the preferred embodiment of the process control system 10 which includes a time synchronization scheme between the various hierarchical layers. The NIM 602 of the plant control network 11 includes a message recognizer-X 130, and controller A 30 and the redundant controller B 40 if applicable, of the process controller 20, each include a message recognizer-Y 95.

Figure 7:
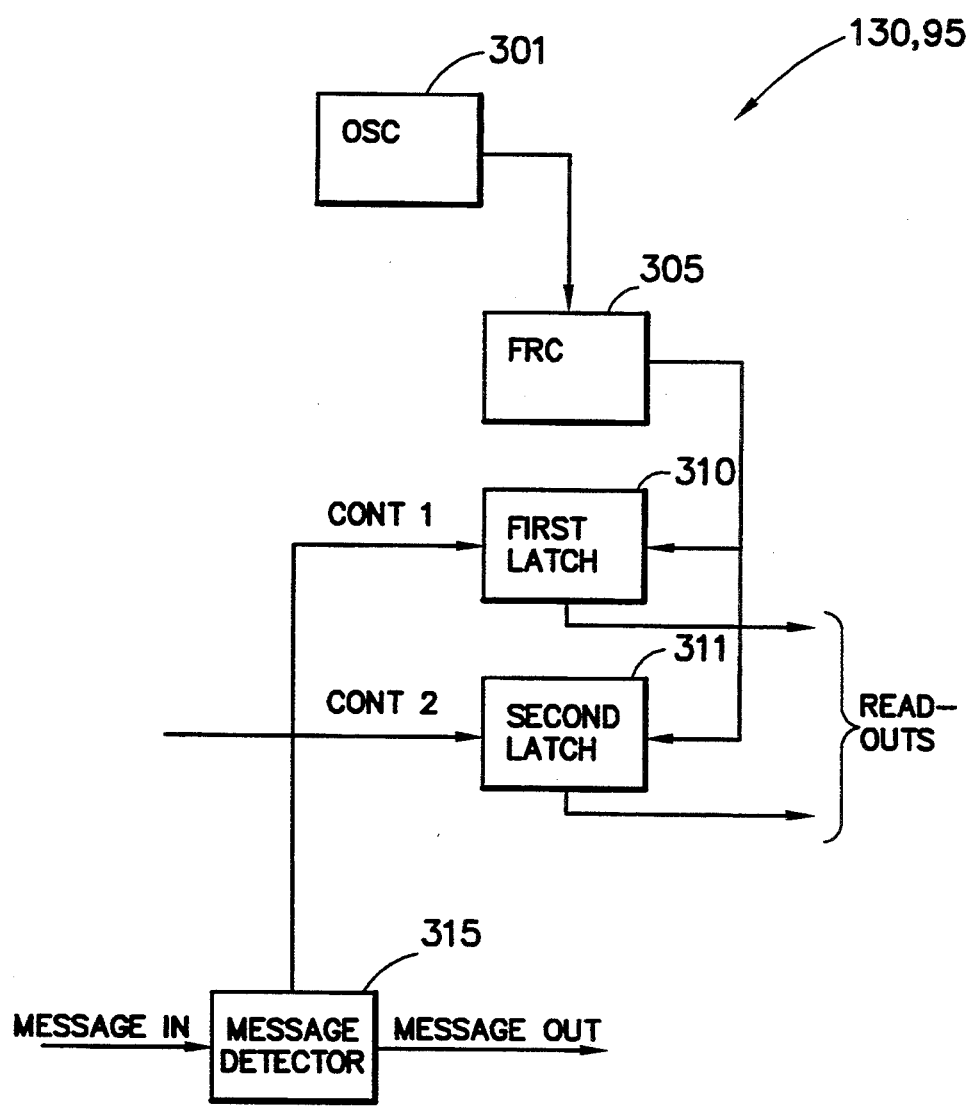
FIG. 7 shows a block diagram of a message recognizer of the preferred embodiment of the process control system.

Referring to FIG. 7, there is shown a block diagram of the message recognizer 130, 95. An oscillator 301 drives a free running counter (FRC) 305. A first and second latch 310, 311 is included and permits the contents of the FRC 305 to be stored in the latches upon command. A message detector 315 samples the messages being transmitted or received. The message detector 315 provides the first control signal, CONT 1, which latches the contents of the free running counter 305 into the first latch 310 when a unique header of a synchronization message is transmitted or received. This latching is essentially simultaneous in all devices on the same network bus and provides the basis for all subsequent synchronization activities, No other types of messages latch the free running counter 305. The second latch 311 of the message recognizer 130, 95 is used in various ways to provide the accurate synchronization times required for various applications of the present invention. In the preferred embodiment of the present invention a second control signal, CONT 2, is provided to cause the second latch 311 to latch upon a predetermined software command. The control of the second latch will be explained in further detail hereinunder. The first and second latches 310, 311, are both readable by a corresponding computer included in the network. The length and resolution of the free running counter 305 and the latches are determined by the time resolution desired, the synchronization interval, and other factors well known by those skilled in the art. Although the preferred embodiment of the present invention utilizes protocols can be used, including IEEE 802.3, as will be recognized by one skilled in the art.

The method of time synchronization between hierarchical layers will now be described. The time (i.e., real time in digital format in terms of hours, minutes, seconds) within the plant control network 11 is referred to as "LCNTIME". The time is generated by timing subsystems of each of the physical modules 122, 124, 126, and the NIM 602 (the NIM being a node coupled to the LCN 120). The timing subsystem of each of the physical modules are denoted by the letter X. The clock-X maintained by each of the physical modules are all the same, the clocks being synchronized under control of a bus controller 128, in a manner well understood by those skilled in the art; specifically, the manner is described in U.S. Pat. No. 4,890,222, "Apparatus for substantially synchronizing the timing subsystem of the physical modules of a local area network", the patent being assigned to the same assignee of the present application.

The controllers 30, 40 each have their respective timing subsystems, denoted as Y, which has a controller time, CONTIME, which can be skewed from the LCNTIME.

Figure 8:
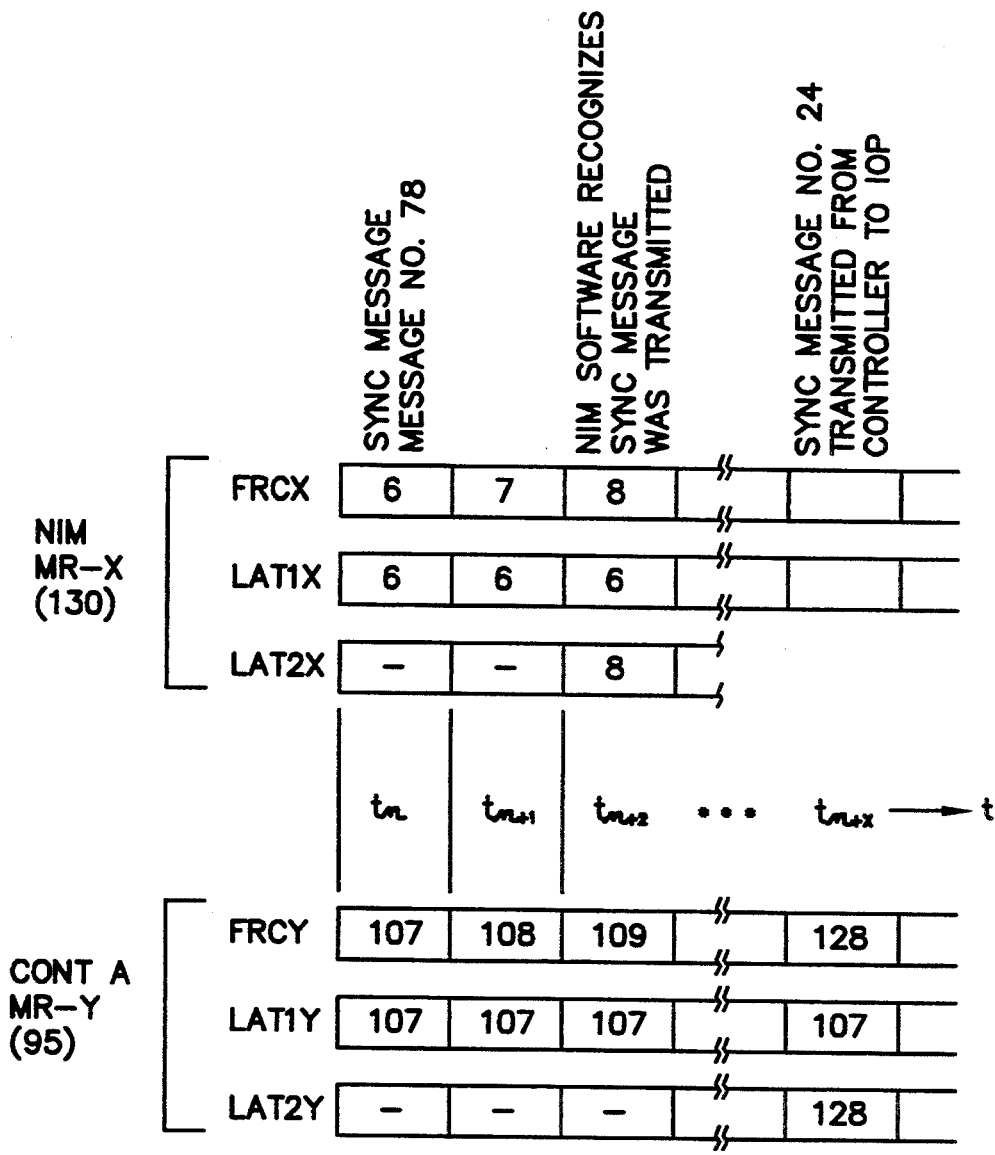
FIG. 8 shows a time line example of events which occur in the synchronizing of two networks.

Referring to FIG. 8, there is shown a time line example of the events which occur in the synchronizing of the two networks, CONTIME being synchronized to LCNTIME. In the preferred embodiment every six seconds a synchronization message is transmitted by the NIM 602. The synchronization message has a format which is detectable by the message recognizer 130, 95 and further contains a message number. The message number is a sequential number which identifies the number of messages which have been transmitted. When the synchronization message is transmitted over the UCN 14, at time $t_n$, the message recognizer-X 130 and the message recognizer-Y 95 each detect that a synchronization message was transmitted/received, respectively. Thus, each first latch 310 latches the contents of the respective free running counter 305. Assume for purposes of example that the free running counter (FRCX) 305 of the message recognizer-X (MR-X) 130 has a value of 6 at the time the synchronization message is actually transmitted over the UCN 14, the synchronization message having a message number of 78. Since the actual transmission time over the UCN 14 is essentially zero, the first latch (LAT1X) of MR-X 130 latches the contents of FRCX such that the contents of LAT1X is also a 6. Further, the first latch (LAT1Y) 310 of the message recognizer (MR-Y) 95 latches the contents of the free running counter (FRCY) 305 of the MR-Y 95, such that in this example the contents of FRCY and LAT1Y are both 107, the time of the actual transmission of the synchronization message over the UCN 14 occurring at time $t_n$.

Assume in this example at $t_{n+1}$ nothing occurs. Again in this example at $t_{n+2}$, the control software of the NIM 602 recognizes that a synchronization message was transmitted. The control software of the NIM 602 reads the current value of the clock-X, i.e., LCNTIME, and causes the second control signal CONT2 of the MR-X 130 to be generated such that the contents of the second latch (LAT2X) of the MR-X 130 contains the value of 8, the current value of FRCX 305. The NIM 602 then calculates the real time the sync message was transmitted in accordance with the following formula:

$$TIMESYNC = CLOCK\ X - (LAT2X - LAT1X).$$

This time, denoted as LCNTIME1, is the real time that the message having serial number 78 was transmitted. The NIM 602 sends a second message to the controller 30 which includes the value of TIMESYNC and the message number in this example the message number was 78. This message has a format such that it is not recognized by either message recognizer 130, 95. Upon receipt of this second message the controller associates the contents of LAT1Y with LCNTIME1 thereby synchronizing the controller to the LCNTIME. Thus the preferred embodiment of scheme the time synchronization is a two message pair. Thus, for the controller 30 in this example, the value in LAT1Y corresponds to LCNTIME1. Someone skilled in the art would recognize that the two message pair could be implemented in one message type by including the real time of the previous sync in the data field of the next sync message.

Asynchronously, every two second in the preferred embodiment of the time sync scheme, a synchronization message is transmitted by the controller 30 over the bus (I/O link) 22 to the IOP 21. At some time, LCNTIME 2, the sync message is sent over the I/O link 22. At the time that the sync message is transmitted by the I/O link 22 the second latch (LAT2Y) 311 of MR-Y 95 is caused to latch the contents of the FRCY 305 by the I/O interface 80. In the example, the FRCY 305 has a value of 128 and the contents stored in LAT2Y is also 128 as a result of the latching process. The sync message to the IOP 21 also contains a message number (the message number is 24 in this example), the message number to the IOP being independent of the message numbers received from the NIM 602. The controller 30 calculates LCNTIME2, the time the sync message was sent to the IOP as follows:

$$LCNTIME2 = LCNTIME1 + (LAT2Y - LAT1Y).$$

The controller maintains a list of sync ID numbers and the corresponding LCN times for the last 300 minutes worth of sync ID values, in the preferred embodiment. This table is also maintained in the backup controller. After each IOL time sync broadcast, the primary controller transfers the IOL sync ID number and the corresponding LCN time to the backup controller over the UCN and the IOL.

The IOL time sync message resets a time counter maintained in the IOP; thus, LCNTIME2 corresponds to zero time in the IOP 21. Thus a time base is established for the I/O link 22. When the IOP 21 detects an event change on one of the inputs from the field devices, the occurrence of the event is associated with a value in the time counter maintained in the IOP. At some time when the controller requests data from the IOP (recall in the preferred embodiment of the present system that the IOP 21 only responds to request from the controller), the IOP transmits to the controller the input point of the event, the value of the time counter when the digital event occurred, plus the message number of the sync ID message. Thus in this example the message number will have a message ID of 24, the sync time will have the value of the time counter maintained in the IOP when the event occurred, and the point number will correspond to the input point (if the IOP has 32 inputs, the point number will have a value of between 1 to 32 depending on the input point of the event. The input point is associated with the function of the event which was read. When the controller receives the information the controller adds the value of the time counter maintained in the IOP to the LCNTIME2 to obtain the actual time of the occurrence of the event.

The preferred embodiment of the present invention describes a method and apparatus for providing time synchronization of data transmitted between devices of bus type local area networks. In addition an alternative method is described in which the real time is maintained by a master device (the controller) rather than in the slave device (IOP). It will be obvious to one skilled in the art that the timed synchronization process between the controller and the IOP can be implemented in the same fashion as the synchronization between the LCN network and the controller by including the message recognizer apparatus internal to the IOP's.

Figure 9:
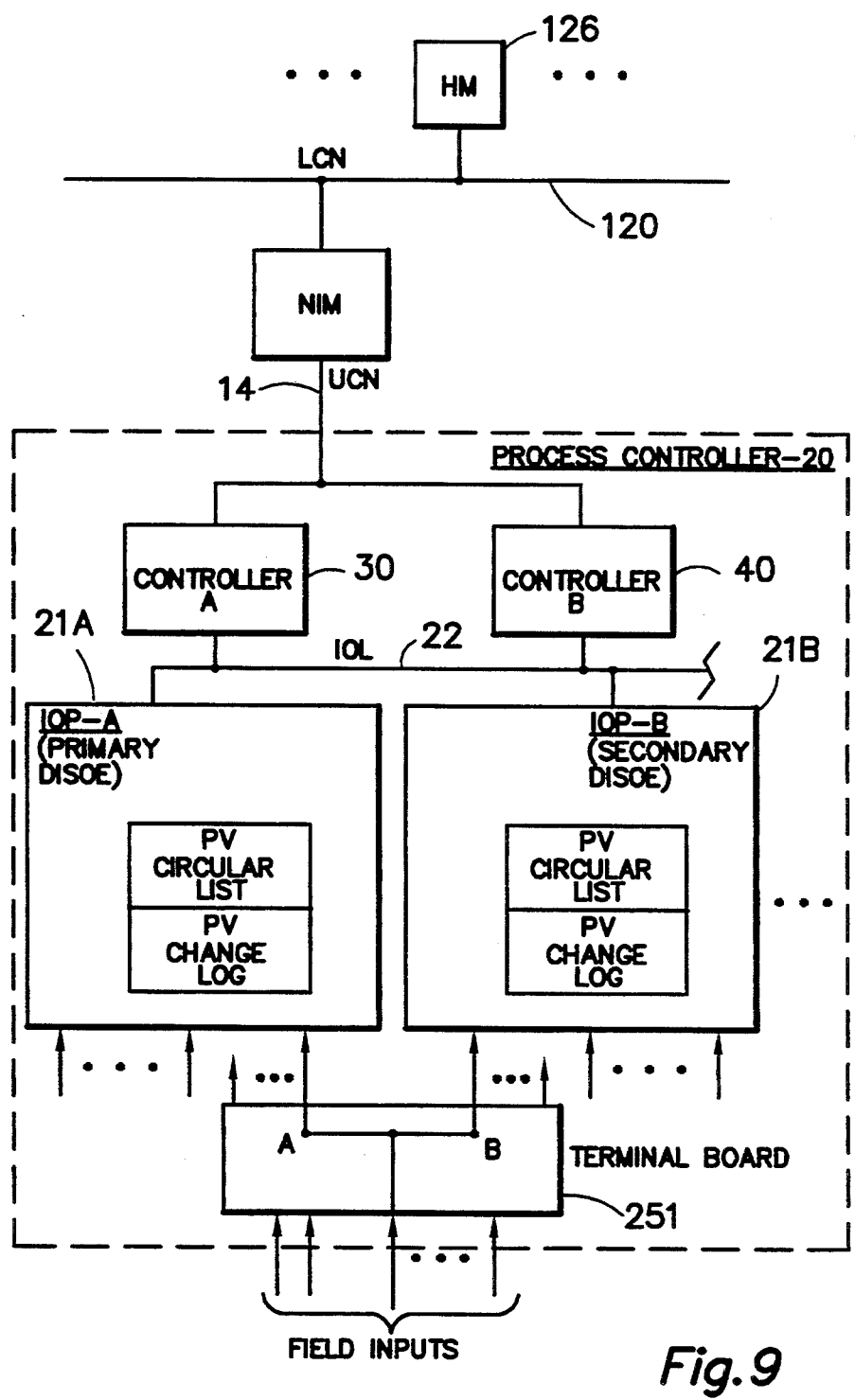
FIG. 9 shows a block diagram of the process control system which includes the functions necessary to support the method of the present invention.

Referring to FIG. 9, there is shown a block diagram of the process control system which includes the elements necessary to support the method of the present invention. There is included a digital input IOP 21 A, B (referring to herein as DISOE) to which digital information indicative of events data is inputted. The digital events data, sequence of events (SOE) data, is time tagged by the DISOE. When the state change of any input changes, that information is stored and time tagged by the DISOE with the relative time and sync ID number is accordance with the scheme described above. The IOP 21 (DISOE), which is the element which detected the occurrence of the event, is the element which time tags the data. In previous systems, the time stamp (or tag) was performed by some other node at a different layer in the hierarchy; namely the NIM 602, which is at time later the actual time of occurrence of the event. Therefore, the time resolution of the method of the preferred embodiment is significantly enhanced.

As described above one controller, controller A 30, is operating as a primary controller and controller B 40 is operating as a secondary. Similarly IOP-A 21A is operating as a primary IOP and IOP-B 21B is operating as a secondary IOP. The inputs from the field devices go to both IOPs 21A, 21B, via a terminal board 251. The communication between the controller 30 and the IOP-A 21A is as described above. Recall that IOP-B 21B is executing the same task as the primary IOP 21A, and is eavesdropping on all the communications between the controller A30 and IOP-A 21A. Time sync is a broadcast over the I/O link and is received equally by all IOPs present on the IOL. When an event occurs, the relative internal clock of each IOP plus the sync ID is tagged with the input data in each IOP 21A, 21B. The events/time data is stored in each IOP. The controller A30 periodically requests the events/time data from IOP-A, calculates the real time, and subsequently transfers that information to the process control network, including the history module 126.

Each DISOE IOP 21 includes two buffers a PV circular list (or more simply circular list or list) and a PV change log (or more simply change log or log). The circular list contains all the events (with time of occurrence) created by the IOP based on the change status of the digital inputs for collection by the controller 30. When the events from the list are collected by the controller 30, that data in the list is essentially gone. However, the change log maintains the events data (and corresponding time tag) in the change log buffer for a predetermined period of time. In the preferred embodiment, data in the log is kept for the past 20 seconds, this time being long enough to ensure that events are saved for recovery due to failover at any layer in the hierarchy. Recall that in the preferred embodiment, requests from the controller for events data from the IOP-A is every half second. Therefore, in the event a malfunction and failover occur, any events data is not lost. The maintenance of the log and list is via pointers well known to those skilled in the art.

There exists in the IOP sufficient information to recreate the events following a system alarm recovery command from a node in the hierarchy. Event recovery provides the capability whereby alarms and other dynamic event data is recreated in response to the recovery command. It is the process in which events are recovered following a node failover. Therefore, if a node such as the NIM 602 or the controller 30 undergoes a failover; the new primary commands an event recovery to ensure that no event data is lost. The operations associated with the log are two-fold. First, a continuous background operation processes the log and discards any SOE data that are older than the defined time period. Secondly, the event recovery process has the capability to 'freeze' the log and use the log's information to recreate SOE data. This freeze operation means that while frozen, the background purge activity is blocked from deleting information past the defined time. It is not frozen with respect to new SOE information; SOE data that occurs after event recovery starts is placed in the log so that it is not lost. Once the event recovery operation has processed the log, it unfreezes the list and the background operation can eliminate out-of-date information. The freeze permits a node which fails over to command recovery within 20 seconds, in the preferred embodiment.

Some total system operations will now be described in order to give an overview of some failover scenario's. First consider the case of the failover of a SOE Input Processor. Redundant Input Processors are synchronized, such that they have the exact same configuration data base. Both partners are connected to the physical inputs, and are processing digital state changes and producing SOE time ordered information. Upon failure of the primary, the secondary fulfills the role of primary and is commanded to recreate all event information, including SOE data. It does so using the change log; the change log has all SOE information for the last n seconds (n being the system design constant). This information is then made available to the Controller via the appropriate event reporting mechanism. The Controller then has the responsibility to report this data to its next layer, such that data will eventually reach the historization device as if it has originated in the original primary Input Processor. It is possible to receive the same information more than once, but duplicates are acceptable whereas lost information is not.

The next case is a failover of the Controller. The important item to consider is that when a Controller fails over to a Secondary, the Secondary will command all I/O processors to recreate all event information and then will pass this data to the upper layers. The SOE Input Processor will do so using the same method as is done for its own failover. Note that redundant SOE Input Processors are not required in order to have Controller redundancy.

Finally, consider the case of NIM 602 redundancy. On the occurrence of its failover, the NIM secondary device will command all Controllers to recreate all events within their domain. Hence, this is an extrapolation of Controller redundancy, and is satisfied using an identical method. Further details regarding the Controller and NIM failover, and the IOP failover operations can be had by reference to U.S. Pat. Nos. 5,016,244 and 5,136,498, respectively, both patents being assigned to the same assignee as the present applications.

While there has been shown what is considered the preferred embodiment of the present invention, it will be manifest that many changes and modifications can be

We claim:

1. In a process control system having a redundant multilayer multinode hierarchical structure, each node of a layer being redundant, and further wherein sequence of events inputs are received from field devices by a receiving input/output processor (IOP), the receiving IOP being a digital input sequence of events (DISOE) IOP, the IOP being the lowest layer of the hierarchical structure, the IOP interfacing with a controller at the next layer of the hierarchy, a method for reliability maintaining a sequence of events function during a failover of any of said redundant nodes, the method comprising the steps of:

a) receiving events data from said field devices by the receiving IOP;
   b) maintaining a first buffer with events data, said first buffer being a circular list, said events data being time stamped by the receiving IOP with a relative time of receipt and a sync message ID, the relative time of receipt being a number of clock times since receipt of a time synchronizing message from the controller, the time synchronizing message further including the sync message ID, said events data in the first buffer being the events data received since a previous transmission of said events data to the controller;
   c) maintaining a second buffer with events data, said second buffer being a circular list, said events data being time stamped by the receiving IOP with the relative time of receipt, said events data in the second buffer being events data received within a predetermined period such that a history of events is maintained for the predetermined period;
   d) upon request from the controller, transmitting the events data and the corresponding relative time of receipt from the first buffer to the controller whereby the controller calculates a real time of occurrence of the events data, the real time of occurrence being time synchronized to the process control system; and
   e) when a failover is detected, upon a request for event recovery from any of the hierarchical layers, recreating the events data from the second buffer to transmit the recreated events data to the controller in accordance with a predefined protocol thereby avoiding the loss of any events data as a result of the failover.

2. A method for reliably maintaining a sequence of events function according to claim 1, wherein the step of maintaining a second buffer further comprises the steps:

a) during a failover, freezing a purge operation of the events data in the second buffer even though the events data is older than the predetermined period of time;
   b) continuing to store events data in the second buffer during the failover thereby not losing any events data; and
   c) upon completing processing events data in the second buffer, unfreezing the purge operation of the second buffer to eliminate out of date events data.

* * * * *